United States Patent [19]

Westimayer et al.

[11] 4,278,302
[45] Jul. 14, 1981

[54] GROUSER BAR TRACK ASSEMBLY FOR SNOWMOBILE

[75] Inventors: David A. Westimayer; Stephen C. Scholten, both of Horicon, Wis.

[73] Assignee: Deere & Company, Moline, Ill.

[21] Appl. No.: 72,153

[22] Filed: Sep. 4, 1979

[51] Int. Cl.³ ............................................. B62D 55/24
[52] U.S. Cl. .............................. 305/35 EB; 305/35 R; 305/54
[58] Field of Search ................. 305/24, 27, 28, 35 R, 305/35 EB, 37, 38, 41, 54, 57, 56

[56] References Cited

U.S. PATENT DOCUMENTS

| | | | |
|---|---|---|---|
| 3,694,040 | 9/1972 | Hallaman | 305/38 |
| 3,758,170 | 9/1973 | Mazurek | 305/35 EB |
| 3,765,731 | 10/1973 | Kilbane, Jr. | 305/35 EB |
| 3,930,689 | 1/1976 | Maki | 305/35 EB |

*Primary Examiner*—Charles A. Marmor

[57] ABSTRACT

A grouser bar track assembly for a snowmobile that includes a central and two outer continuous belt members are spaced apart in a direction transverse to the length of the belts so as to define a pair of parallel grooves extending around the assembly. There is provided a series of transversely extending grouser bars fixed to and projecting outwardly from the external surfaces of the belts so as to extend across the grooves between the respective adjacent edges of the central and outer belts. Each of the grouser bars have built-in flex points and each of the flex points of adjacent bars are offset in a transverse direction from those of the adjacent bars. Transversely extending surface lugs project from the outer surface of the respective belts and are in advance of and closely adjacent the flex point of the next adjacent grouser bar. The lugs offer a transverse stiffness at the flex point. The surface lugs project out further than the outer extremities of the grouser bars and are the primary contact points between the entire assembly and the ground or snow surface.

9 Claims, 5 Drawing Figures

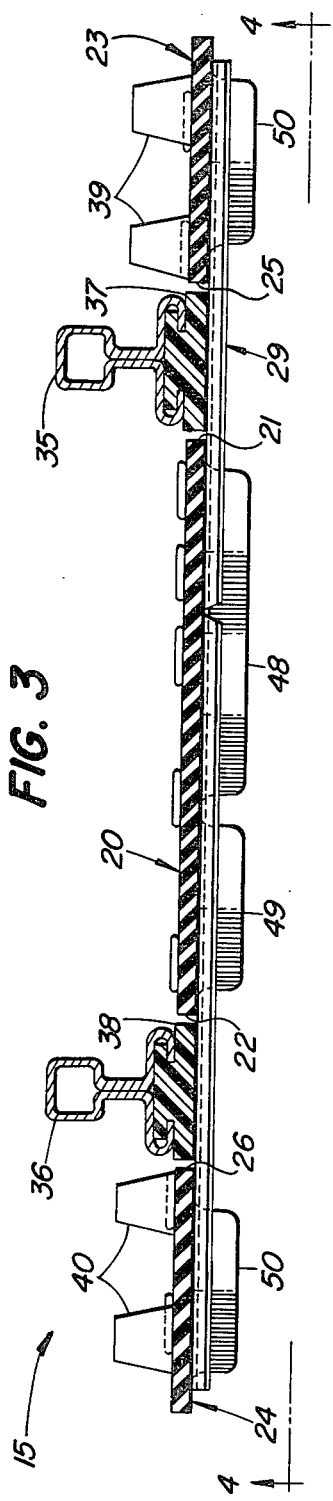
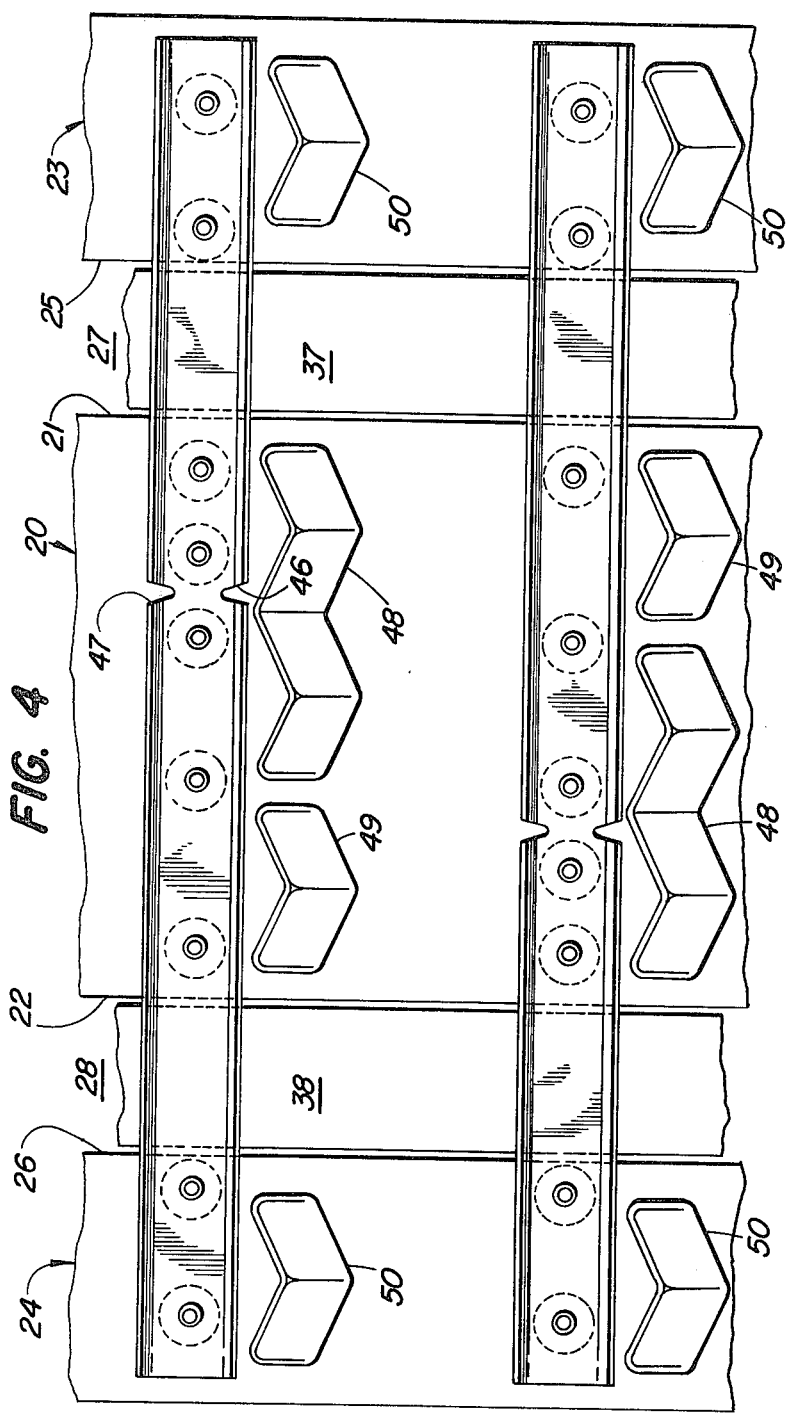
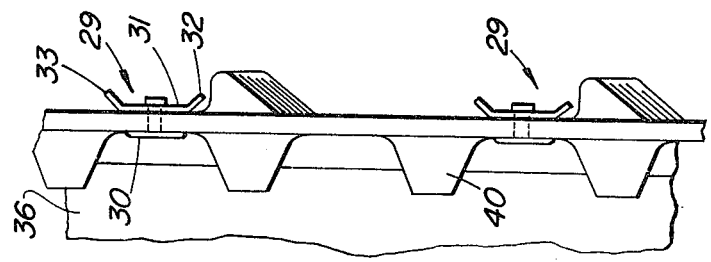

GROUSER BAR TRACK ASSEMBLY FOR SNOWMOBILE

BACKGROUND OF THE INVENTION

Snowmobiles are generally composed of a main frame which carries the engine, the operator's station, and the control mechanisms for the snowmobile. Positioned on the forward end of the snowmobile is a pair of snow engaging skis that may be steered for turning the snowmobile. The rear portion of the snowmobile carries the drive mechanism for the snowmobile which is generally composed of continuous belts driven by sprockets. Normally, there are three belt sections that make up the belt drive. They are a central belt, generally wider than the others, and two relatively narrow outer belts. The outer surfaces of the belts carry snow engaging lugs which cause the snowmobile to move when the belts are driven. The outer belts have their inner edges spaced from the outer edges of the central belt. The three belts are connected by what is commonly known in the trade as grouser bars. The grouser bars are conventionally metal bars that extend substantially the full width of the three belts and have portions thereof which extend between the gaps or grooves between the inner and outer belts. There is provided on the snowmobile a pair of guide rails that extend fore-and-aft of the machine. The guide rails face downwardly to engage the upper surfaces of the grouser bars in the gaps between the respective belts. The grouser bars have, as viewed in cross-section, a flat main bar portion with outwardly extending flanges at the front and rear edges of the bar portions.

One of the problems that exists with respect to the present type of belt structure that uses grouser bars is that the grouser bars are relatively stiff in the transverse direction and consequently, a stone or foreign object that may come into contact with the underside of the belt along one edge of the belt will tend to lift one side of the snowmobile. In some instances, if it is great enough, the stone or foreign object may even turn the snowmobile over to its side. Also, in some instances, the transverse flanges on the grouser bars tend to operate to steer or guide the entire snowmobile in a transverse direction. The grouser bar flanges may bite into the snow or ice and tend to turn or slide the snowmobile to one side. In many instances, this is an undesireable characteristic. This is particularly so when the entire length of the grouser bar is rigid and not flexible.

With the above in mind, it is the primary object of the present invention to provide a belt structure for a snowmobile, somewhat similar to that above described, but having incorporated in each grouser bar flex points or flex areas. Such flex points or areas may be created merely by cutting away a portion of the respective flanges at the front and rear edges of the grouser bars. The advantage of having such flex points occur upon the belt structure passing over a stone or other foreign object. In such an instance, the stone or foreign object might raise one side of the unit, but since the belt flexes at its flex point, the belt structure would yield in this area. Consequently, there would be less tendency for a stone or foreign object to tilt the snowmobile to a point where it turns over.

It is also an object of the present invention to provide transversely elongated lugs on the outer surfaces of the respective belts that will be in leading but close relation to the grouser bars and will extend across the area where the flex points exist on the grouser bars. The lugs will afford stiffness of the belts in the area of the flex points on the grouser bars. Consequently, the lugs will tend to eliminate constant flexing of the belt at those points as compared to bending when a large foreign object contacts one side of the belt structure. This, of course, will lead to a longer life of the grouser bar as well as the entire belt structure. It is further proposed to have the vertical length or depth of the lugs to be greater than the vertical length or depth of the flanges on the grouser bars. This will tend to eliminate the slicing or cutting action of the grouser bars as they contact the ground and to further eliminate the tendency of the snowmobile to accelerate in its movement in a transverse direction when it begins to slide from one side or the other.

BRIEF DESCRIPTION OF THE DRAWINGS

FIG. 3 is a sectional view taken substantially along the line 3—3 of FIG. 2.

FIG. 4 is a bottom view of the belt structure as taken substantially along the line 4—4 of FIG. 3.

FIG. 5 is a side view taken of the portion of the belt shown in FIG. 4.

DESCRIPTION OF THE PREFERRED EMBODIMENT

Figure 1:
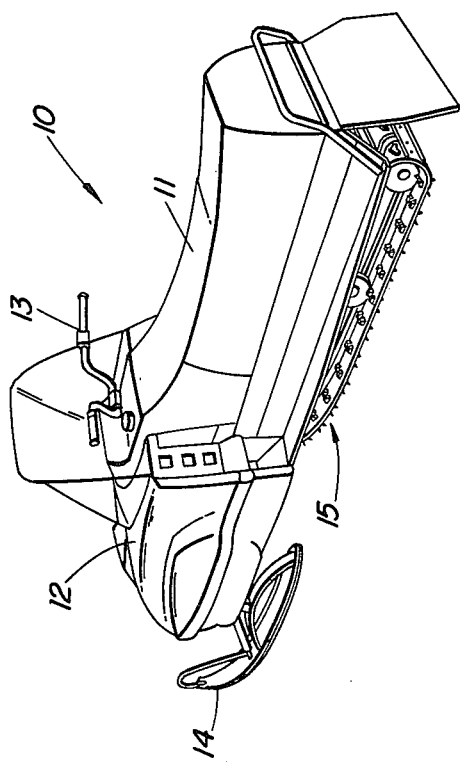
FIG. 1 is a perspective view of a snowmobile incorporating the belt structure of the present invention.
Figure 2:
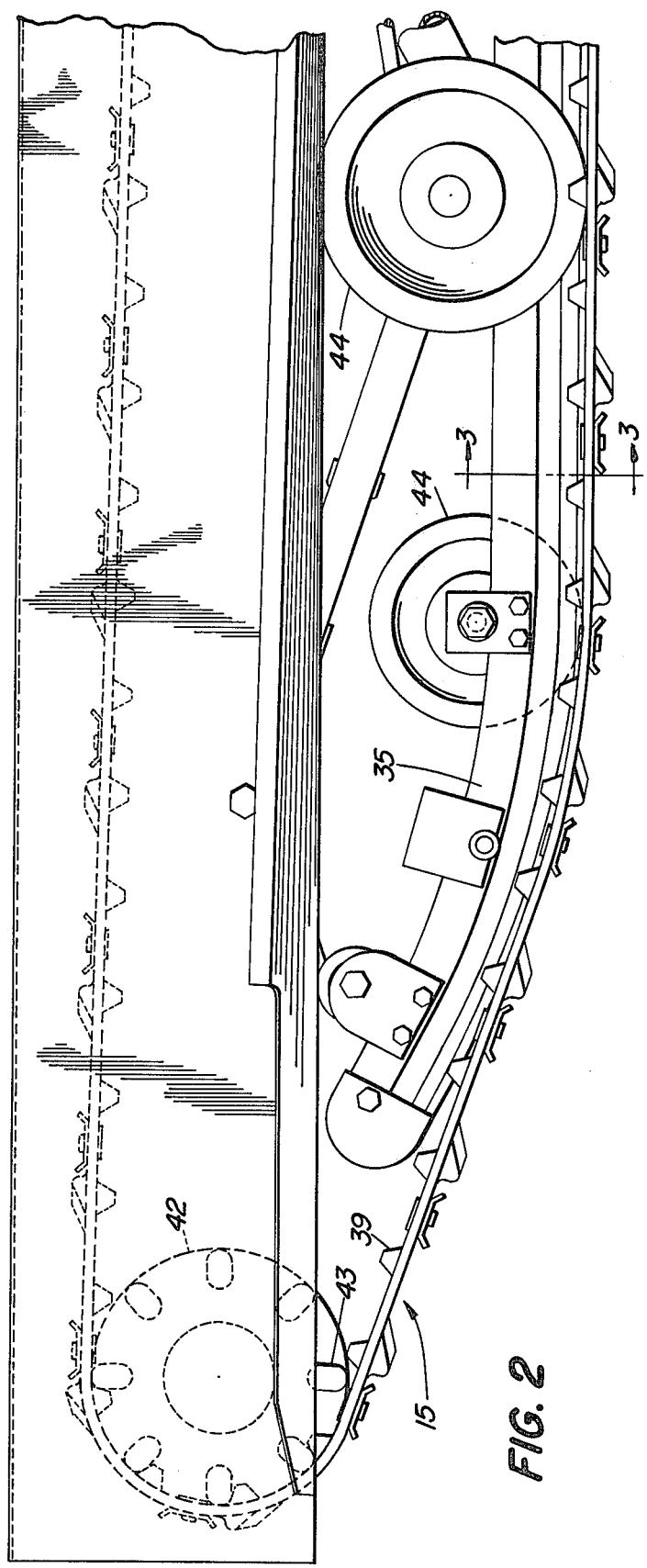
FIG. 2 is an enlarged side view of a portion of the belt structure and guiding elements for the belt structure.

Referring now to FIG. 1, there is shown a snowmobile with a snowmobile body having a seat 11 extending fore-and-aft on the rear portion thereof and behind the power train of the snowmobile, indicated by its cowling 12, and steering control 13. The forward end of the snowmobile body 10 is carried on a pair of conventional type skis 14 that control turning of the snowmobile in response to turning of the steering control 13. The rear portion of the snowmobile is carried on a belt structure indicated in its entirety by the reference numeral 15 which is driven in conventional manner by the engine under the cowling 12.

Referring now to FIGS. 2-5, inclusive, the belt structure is composed, in part, of a continuous relatively wide central belt 20 having opposite edges 21, 22. There is further provided a pair of narrow continuous outer belts 23, 24 having inner edges 25, 26 respectively that are transversely spaced from the respective opposite edges 21, 22 of the central belt so as to define, therewith, a pair of parallel grooves 27, 28.

A number of grouser bars 29 extend transversely across and are disposed on the outer side of the belts 20, 23, 24. The bars extend substantially the full transverse expanse of those belts. Rivet-type pins, such as at 30, extend through the respective belts 20, 23, 24 and through the respective grouser bars 29. As is clear from viewing FIG. 4, there are portions of each of the grouser bars 29 that extend across the respective grooves 27, 28. Each grouser bar is composed of a generally central flat portion 31, that lays on the surfaces of the belts and a leading flange 32 and a trailing flange 33 that project outwardly from the flat portion.

Above the lower run or the portion of the belt structure that engages the ground, there is provided a pair of guide rails 35, 36 that are received in the respective grooves 27, 28. The guide rails 35, 36 are rigidly fixed and serve, in part, as the frame of the snowmobile. Fixed or mounted to the underside of the respective guide rails 35, 36 are wear plates 37, 38 which are positioned in the respective grooves 27, 28 and engage the upper surfaces of the grouser bars 29.

The inner surfaces of the outer belts 23, 24 are provided with transversely spaced and inwardly projecting sprocket teeth 39, 40. Just forwardly of the forward ends of the guide bars 35, 36 are a pair of drive sprockets, one of which is shown at 42. The sprockets 42 have teeth 43 adjacent the periphery of the sprocket that project to opposite sides of a central plate-like member. Additional sprockets and wheels, such as shown at 44 are supported on the snowmobile frame and engage the upper surfaces of the lower runs of the belts for retaining the respective belts in engagement with the ground. The guide rails 35, 36 while being a portion of the frame of the snowmobile, are never-the-less yieldably suspended from the underside of the snowmobile so that the guide rails 35, 36 may yield toward and away from the underside of the snowmobile. The suspension system may be of the type shown in U.S. Pat. No. 3,750,774. It should, however, be recognized that the actual suspension between the snowmobile and the guide rails 35, 36 serve no part of the present invention other than to understand that the guide rails do partially assure proper contact of the belts with the ground.

Referring to FIG. 4, it will be noted that the grouser bars 29 are provided with notches 46, 47 extending through the leading flange 32 and the trailing flange 33 respectively and a part of the flat portion 31 of the grouser bar. The notches 46, 47 are V-shaped so that should it be necessary for the grouser bar to bend, the portion of the grouser bar between the apex portions of the respective notches 46, 47 creates a flex or bend point. It should be noted that the notches 46, 47 of successive grouser bars are offset transversely from one another so that the same flex or bend point in the central belt 20 does not occur uniformly between grouser bars.

The grouser bars are offset just rearwardly of cleats or lugs 48. As can best be seen in FIG. 5, the vertical length or depths of the lugs or cleats 48 are considerably greater than the vertical dimension of the grouser bar flanges 32, 33. Also, with respect to the notches 46, 47, due to the transverse length of the cleats 48 the cleats or lugs extend considerably to opposite sides of the notches 46, 47. This serves an important purpose since due to the height or depth of the cleats 48, they create a relatively stiff characteristic in that portion of the belt from which the cleats extend. Since the notches 46, 47 are closely adjacent to those cleats 48, there will be added transverse stiffness at the very area that the flex points occur in the belt. Additional cleats, such as at 49, are provided on the surface of the central belt 20 but are comparatively narrow in a transverse direction since they are completely offset in a transverse direction from the respective notches 46, 47. Also, relatively narrow cleats such as at 50 are provided on the outer belts 23, 24. Further, it should be noted that the central belt has a flexing area between cleats 49 and 48 and that this area is always in advance of a portion of the adjacent grouser bar.

It should here be understood that one of the main advantages of having the cleats 48, 49 of greater depth than the flanges 32, 33 is that the cleats will tend to determine the penetration of the snowmobile belt into the surface of the snow or ground cover. The cleats will tend to limit or prevent a transverse shifting of the snowmobile as it moves about a curve or along a hillside. The sliding action that occurs by the cutting action of the transverse flanges 32, 33 is consequently held to a minimum.

We claim:

1. A continuous grouser bar track for a snowmobile comprising: a central relatively wide continuous belt having opposite edges and a pair of narrow continuous outer belts having inner edges transversely spaced from the respective opposite edges so as to define therewith a pair of parallel grooves; a series of transverse grouser bars fixed to and projecting outwardly from the external surfaces of the belts extending across the grooves and having a transverse expanse substantially equal to the transverse expanse of said belts, each of said grouser bars having predetermined flex points and successive grouser bars having their respective flex points at different transverse locations; transversely elongated surface cleats integral with and projecting from the outer surfaces of the belt assembly, said cleats being located in advance of but closely adjacent the flex points of respective grouser bars and extending transversely to opposite sides of the respective flex points so as to afford transverse stiffness to the belt at said flex points.

2. The invention described in claim 1 in which the grouser bars are composed in cross-sections of flat portions that lie against the belt and flange portions that extend outwardly from the flat portions, and the cleats extend outwardly at a substantially greater distance than the flanges.

3. The invention described in claim 2 in which the flex points are created by notches cut in the flange portions.

4. The invention described in claim 2 in which the flex points are created by notches cut through the flange portions and partially through the flat portions.

5. A continuous grouser bar track for a snowmobile comprising: a central relatively wide continuous belt having opposite edges and a pair of narrow continuous outer belts having inner edges transversely spaced from the respective opposite edges so as to define therewith a pair of parallel grooves; a series of transverse grouser bars fixed to and projecting outwardly from the external surfaces of the belts extending across the grooves and having a transverse expanse substantially equal to the transverse expanse of said belts, each of said grouser bars having predetermined flex points and successive grouser bars having their respective flex points at different transverse locations; transversely elongated surface cleats integral with and projecting from the outer surfaces of the belt assembly, said cleats being located in advance of but closely adjacent the flex points of respective grouser bars and extending transversely to opposite sides of the respective flex points so as to afford transverse stiffness of the belt at said flex points, said cleats being transversely offset from one another so as to provide flex points in the belt that are in advance of a portion of the trailing grouser bar not containing an aforesaid flex point on the grouser bar.

6. A continuous grouser bar track for a snowmobile comprising: a central relatively wide continuous belt having opposite edges and a pair of narrow continuous outer belts having inner edges transversely spaced from the respective opposite edges so as to define therewith a pair of parallel grooves; a series of transverse grouser bars fixed to and projecting outwardly from the external surfaces of the belts, each of the grouser bars extending across the grooves and having outwardly extending transverse flanges, said flanges having notches therein to provide flex points in said grouser bars; transversely elongated surface cleats integral with and projecting from the outer surfaces of the belt, said cleats being located in spaced advance of but closely adjacent the grouser bars and extending outwardly beyond the outer extent of said flanges, and at least part of said cleats being in advance of and extending to opposite sides of the aforesaid notches to thereby afford transverse stiffness in the belt at the notches.

7. A continuous grouser bar track for a snowmobile comprising: a plurality of continuous belts having transversely spaced edges so as to define between the respective edges a groove extending the full length of the belts; a series of transverse grouser bars fixed to and projecting outwardly from the external surfaces of the belts extending across the groove and having a transverse expanse substantially equal to the transverse expanse of said belts, each of said grouser bars having predetermined flex points and successive grouser bars having their respective flex points at different transverse locations than the adjacent grouser bars; transversely elongated surface cleats on at least one of said belts integral with and projecting from its outer surfaces, said cleats being located in advance of but closely adjacent the flex points of respective grouser bars and extending transversely to opposite sides of the respective flex points so as to afford transverse stiffness of the belt at said flex points.

8. The invention described in claim 7 in which said chains are transversely offset from one another so as to provide flex points in the belt that are in advance of a portion of the trailing grouser bar not containing an aforesaid flex point on the grouser bar.

9. A continuous grouser bar track for a snowmobile comprising: a plurality of continuous belts having transversely spaced edges so as to define between the respective edges a groove extending the full length of the belts; a series of transverse grouser bars fixed to and projecting outwardly from the external surfaces of the belts extending across the groove and having a transverse expanse substantially equal to the transverse expanse of said belts, each of said grouser bars having predetermined flex points; transversely elongated surface cleats on at least one of said belts integral with and projecting from its outer surfaces, said cleats being located in spaced advance of but closely adjacent the flex points of the respective grouser bars and extending transversely to opposite sides of the respective flex points so as to afford transverse stiffness of the belt at said flex points.

* * * * *